United States Patent
Mintz et al.

(10) Patent No.: US 11,989,702 B2
(45) Date of Patent: May 21, 2024

(54) AUTOMATED VALIDATION OF DIGIT SEQUENCES IN TRANSACTIONS

(71) Applicant: Intuit Inc., Mountain View, CA (US)

(72) Inventors: Ido Meir Mintz, Tel Aviv (IL); Alexander Zhicharevich, Hod Hasharon (IL); Shlomi Medalion, Lod (IL); Tom Jacobe, Holon (IL)

(73) Assignee: Intuit Inc., Mountain View, CA (US)

(*) Notice: Subject to any disclaimer, the term of this patent is extended or adjusted under 35 U.S.C. 154(b) by 1101 days.

(21) Appl. No.: 16/712,772

(22) Filed: Dec. 12, 2019

(65) Prior Publication Data

US 2021/0182803 A1  Jun. 17, 2021

(51) Int. Cl.
| | |
|---|---|
| *G06Q 20/04* | (2012.01) |
| *G06F 17/16* | (2006.01) |
| *G06N 3/02* | (2006.01) |
| *G06N 20/00* | (2019.01) |

(52) U.S. Cl.
CPC ......... *G06Q 20/042* (2013.01); *G06F 17/16* (2013.01); *G06N 3/02* (2013.01); *G06N 20/00* (2019.01)

(58) Field of Classification Search
CPC ........ G06Q 20/042; G06N 20/00; G06N 3/02; G06F 17/16
USPC .......................................................... 706/12
See application file for complete search history.

(56) References Cited

U.S. PATENT DOCUMENTS

| | | | | |
|---|---|---|---|---|
| 6,760,470 B1 * | 7/2004 | Bogosian | ............... | G06Q 20/40 235/380 |
| 7,546,261 B2 * | 6/2009 | Bogosian | ............... | G06Q 20/40 705/16 |
| 8,490,869 B2 * | 7/2013 | Brown | .................. | G06Q 20/40 235/380 |
| 10,460,382 B2 * | 10/2019 | Dominguez | ....... | G06Q 20/4016 |
| 10,572,607 B1 * | 2/2020 | Lesner | ................... | G06F 40/58 |
| 11,188,981 B1 * | 11/2021 | Shiu | ...................... | G06N 20/00 |
| 11,829,985 B1 * | 11/2023 | Ducker | ............... | G06Q 20/027 |
| 2005/0091524 A1 * | 4/2005 | Abe | ...................... | G06F 21/602 726/26 |
| 2007/0262137 A1 * | 11/2007 | Brown | .................. | G06Q 20/40 235/379 |
| 2009/0326998 A1 * | 12/2009 | Watkins | ................ | G06Q 40/08 705/38 |
| 2011/0166869 A1 * | 7/2011 | Froelich | ................. | H04L 63/08 705/1.1 |
| 2015/0012435 A1 * | 1/2015 | Ramavarjula | ...... | G06Q 20/4016 705/44 |

(Continued)

OTHER PUBLICATIONS

Hyoungwook Nam et al., Number Sequence Prediction Problems for Evaluating Computational Powers of Neural Networks, Published Nov. Jul. 17, 2019 via AAAI, pp. 1-8 (pdf).*

(Continued)

*Primary Examiner* — Manglesh M Patel
(74) *Attorney, Agent, or Firm* — Lathrop GPM LLP

(57) ABSTRACT

A method may include extracting, from a transaction, a routing transit number (RTN) and an account number, embedding the RTN to obtain an RTN vector, embedding the account number to obtain an account number matrix, combining, using a trained machine learning model, the RTN vector and the account number matrix to obtain a combined matrix, and classifying the account number as invalid. The classifying may include applying the trained machine learning model to the combined matrix.

18 Claims, 9 Drawing Sheets

(56) References Cited

U.S. PATENT DOCUMENTS

| | | | | |
|---|---|---|---|---|
| 2015/0026027 | A1* | 1/2015 | Priess | G06Q 10/04 |
| | | | | 705/35 |
| 2016/0119364 | A1* | 4/2016 | Zolli | G06Q 50/01 |
| | | | | 726/26 |
| 2017/0364918 | A1* | 12/2017 | Malhotra | G06Q 40/02 |
| 2019/0279207 | A1* | 9/2019 | Abate | G06Q 20/4016 |
| 2020/0013036 | A1* | 1/2020 | Griffith | G06Q 20/327 |
| 2021/0064861 | A1* | 3/2021 | Semenov | G06V 30/19173 |
| 2021/0248610 | A1* | 8/2021 | Kurani | G06N 20/10 |
| 2021/0295286 | A1* | 9/2021 | Carroll | G06N 20/00 |
| 2021/0334822 | A1* | 10/2021 | Pati | G06Q 40/08 |
| 2022/0138756 | A1* | 5/2022 | Jass | G06Q 20/102 |
| | | | | 705/75 |
| 2022/0277399 | A1* | 9/2022 | Pei | G06N 20/00 |
| 2022/0398670 | A1* | 12/2022 | Howard | G06Q 40/12 |

OTHER PUBLICATIONS

Brownlee Jason, Making Predictions with Sequences, Published Aug. 14, 2019 via machinelearningmastery.com, pp. 1-60 (pdf).*

Cognizant, Advanced AI/ML Solution Detects Check Fraud for a Global Bank, published Jul. 2019 via Cognizant, pp. 1-3 (pdf).*

Ryan Vincent, Scammers Target ACH Transactions, published Apr. 9, 2019 via Industry Drive Inc., pp. 1-8 (pdf).*

Emerj, Artificial Intelligence for Payments—Current Capabilities and Use-Cases, published 2022 via Emerj, pp. 1-12 (pdf).*

Ruchay Alexey et al., The Imbalanced Classification of Fradulent Bank Transactions Using Machine Learning, Published Jun. 26 via Mathematics, 2023, pp. 1-15.*

Lv Fang et al., Detecting Fradulent Bank Account Based on Convolutional Neural Network with Heterogenous Data, Published Mar. 2019 via Hindawi, pp. 1-12 (pdf).*

Eunjeong Choi et al., Machine Learning-Based Fast Banknote Serial Number Recognition Using Knowledge Distillation and Bayesian optimization, published Sep. 2019, pp. 1-18 (pdf).*

Tang, Duyu et al., "Learning Semantic Representations of Users and Products for Document Level Sentiment Classification"; Proceedings of the 53rd Annual Meeting of the Association for Computational Linguistics and the 7th International Joint Conference on Natural Language Processing; pp. 1014-1023; Jul. 26-31, 2015 (10 pages).

Chen, Huimin et al., "Neural Sentiment Classification with User and Product Attention"; Proceedings of the 2016 Conference on Empirical Methods in Natural Language Processing; pp. 1650-1659; Nov. 1-5, 2016 (10 pages).

Ma, Dehong et al., "Cascading Multiway Attention for Document-level Sentiment Classification"; Proceedings of the 8th International Joint Conference on Natural Language Processing; pp. 634-643; Nov. 27-Dec. 1, 2017 (10 pages).

Kim, Jihyeok et al., "Categorical Metadata Representation for Customized Text Classification"; Transactions of the Association for Computational Linguistics; vol. 7, pp. 201-215; Apr. 2019 (15 pages).

* cited by examiner

US 11,989,702 B2

AUTOMATED VALIDATION OF DIGIT SEQUENCES IN TRANSACTIONS

CROSS-REFERENCE TO RELATED APPLICATIONS

This application is related to: U.S. patent application Ser. No. 16/052,086, filed Aug. 1, 2018, entitled "METHOD TO IDENTIFY INCORRECT ACCOUNT NUMBERS" for the purposes of disclosure material depending on the subject matter disclosed.

BACKGROUND

A significant number of financial transactions fail due to invalid account numbers. Automated Clearing House (ACH) transactions are a popular method for processing financial transactions, including bill payments and payroll direct deposits. In many cases, failed ACH transactions are discovered two or three days after the payment is made due to a lack of an efficient and scalable method for accurately validating bank account numbers. The ability to quickly detect invalid bank account numbers would reduce fraud attacks based on invalid bank account numbers and reduce unnecessary fees charged to bank customers who mistype account numbers. In addition, ACH transaction originators may soon be required to use quick and accurate account validation systems prior to initiating ACH transactions.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In general, in one aspect, one or more embodiments relate to a method including extracting, from a transaction, a routing transit number (RTN) and an account number, embedding the RTN to obtain an RTN vector, embedding the account number to obtain an account number matrix, combining, using a trained machine learning model, the RTN vector and the account number matrix to obtain a combined matrix, and classifying the account number as invalid. The classifying includes applying the trained machine learning model to the combined matrix.

In general, in one aspect, one or more embodiments relate to a system including a computer processor, a repository configured to store a transaction comprising a routing transit number (RTN) and an account number, and a transaction validator executing on the computer processor and configured to extract, from the transaction, the RTN and the account number, embed the RTN to obtain an RTN vector, embed the account number to obtain an account number matrix, combine the RTN vector and the account number matrix to obtain a combined matrix, and classify, using the combined matrix, the account number as invalid.

In general, in one aspect, one or more embodiments relate to a method including extracting, from a transaction, categorical features and a digit sequence, embedding the categorical features to obtain an categorical vector, embedding the digit sequence to obtain a digit sequence matrix, encoding, using a first neural network layer of a trained machine learning model, a combination of the categorical vector and the digit sequence matrix to obtain a first output, encoding, using a second neural network layer of the trained machine learning model, a combination of the categorical vector and the first output to obtain a second output and classifying the digit sequence as invalid. The classifying includes applying the trained machine learning model to the second output.

Other aspects of the invention will be apparent from the following description and the appended claims.

DETAILED DESCRIPTION

Figure 1A:
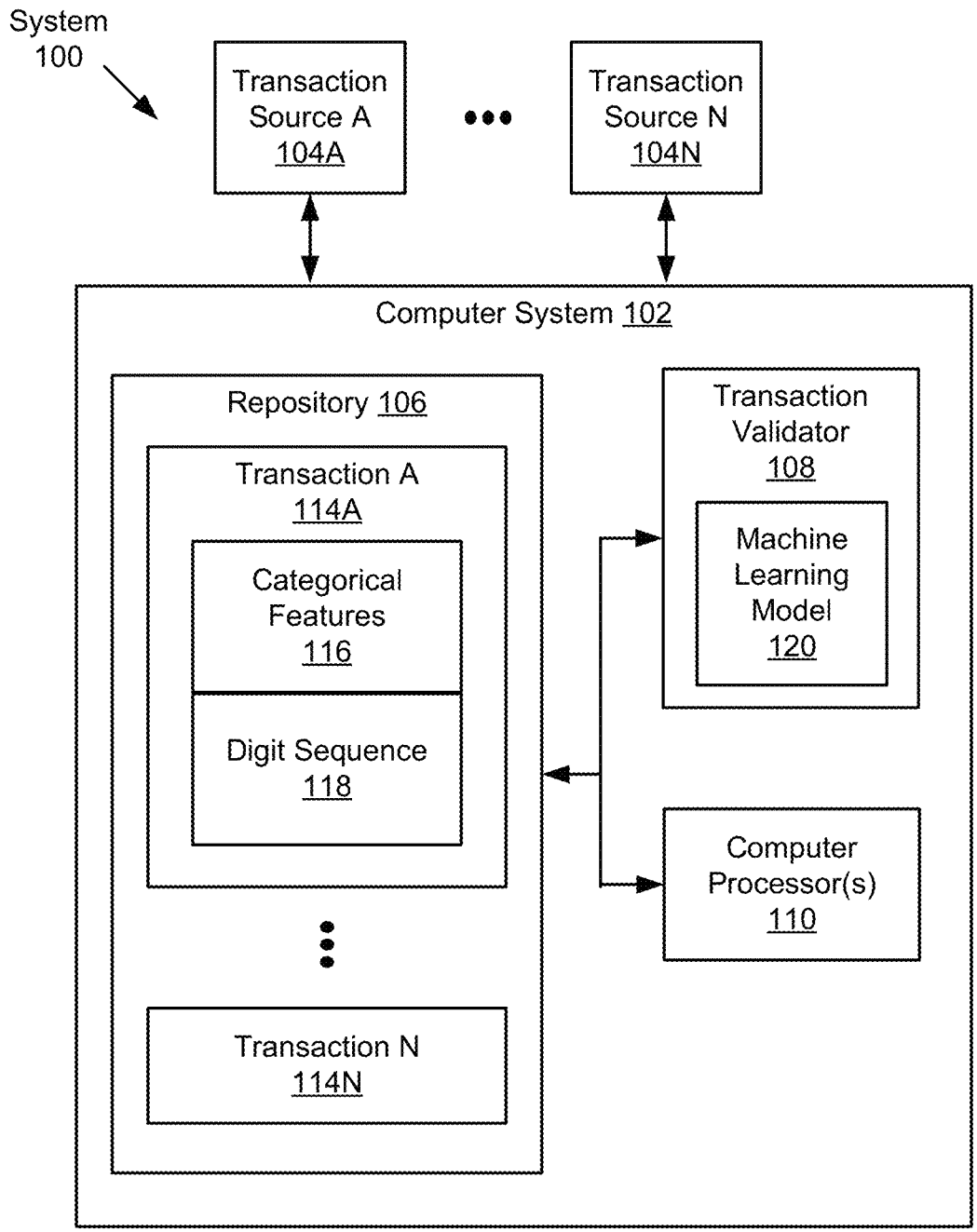
FIG. 1A, FIG. 1B, FIG. 1C, FIG. 1D, and FIG. 1E show a system in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments of the invention are directed to validating an account number of a transaction. For example, the transaction may be an Automated Clearing House (ACH) transaction. In one or more embodiments, categorical features and a digit sequence are extracted from a transaction. The categorical features may represent metadata related to the digit sequence. For example, a routing transit number (RTN) and an account number may be extracted from an ACH transaction, where the RTN represents metadata of the account number. The categorical features may be embedded, by a machine learning model, in a categorical vector that represents the semantics of the categorical features. The digit sequence may be embedded in a digit sequence matrix. The categorical vector and the digit sequence matrix may be combined, using the machine learning model. Alternatively, the RTN may be represented as a digit sequence that may be embedded in a digit sequence matrix, and then combined with the digit sequence matrix corresponding to the account number.

In one or more embodiments, the machine learning model applies one or more neural network layers to the combined matrix. In one or more embodiments, the machine learning model explicitly reinforces and encodes relationships between the categorical features and the digit sequence by combining the categorical vector with the output of multiple neural network layers. Reinforcing attention on the relationships between the categorical features and the digit sequence at multiple neural network layers accelerates the learning of the machine learning model. For example, there may be patterns in the digit sequences that depend on the categorical features. Continuing this example, the RTNs used by a bank may correlate with specific patterns in the account numbers used in the bank's ACH transactions. The machine learning model generates a probability that the digit sequence is invalid. In experimental results, the machine learning model detected almost half of wrongly entered ACH account numbers, with a precision of 70%. The transaction may then be processed according to a policy based on the probability. For example, the policy may decline or delay processing of the transaction.

FIG. 1A shows a system (100) in accordance with one or more embodiments of the invention. As shown in FIG. 1A, the system (100) includes a computer system (102) and transaction sources (104A, 104N). The computer system (102) and the transaction sources (104A, 104N) may correspond to the computing system (500) described with respect to FIG. 5A and the accompanying description below, or take the form of the client device (526) described with respect to FIG. 5B. In one or more embodiments, the computer system (102) and the transaction sources (104A, 104N) may communicate via a computer network (not shown) (e.g., the network (520) described with respect to FIG. 5B).

In one or more embodiments, a transaction source (104A) generates transactions (e.g., 114A, 114N). Examples of transaction sources may include financial institutions (e.g., banks, credit card issuers), retail establishments (e.g., brick and mortar or e-commerce stores), etc. For example, a transaction source (104A) for financial transactions may be a financial institution (e.g., a bank) or credit card processor. Alternatively, a transaction source (104A) for inventory transactions may be a factory or a warehouse.

In one or more embodiments, a transaction source (104A) includes an application. The application may be a software application used by multiple users (e.g., over a network). The application may include functionality to generate, store, process and/or analyze various types of transactions (e.g., 114A, 114N). For example, the application may be a financial management application. The application may be a collection of source code including various software components. The application may include statements written in a programming language, or intermediate representation (e.g., byte code). The application may be transformed by a compiler into binary machine code. Compiled machine code may be executed in order to execute software components generated from the application. In one or more embodiments, the application may be any collection of object code (e.g., machine code generated by a compiler) or another form of the application.

As shown in FIG. 1A, the computer system (102) includes a repository (106), a transaction validator (108), and one or more computer processors (110). In one or more embodiments, the computer processor(s) (110) takes the form of the computer processor(s) (502) described with respect to FIG. 5A and the accompanying description below. In one or more embodiments, the computer processor (110) includes functionality to execute the transaction validator (108).

In one or more embodiments, the repository (106) may be any type of storage unit and/or device (e.g., a file system, database, collection of tables, or any other storage mechanism) for storing data. Further, the repository (106) may include multiple different storage units and/or devices. The multiple different storage units and/or devices may or may not be of the same type or located at the same physical site.

In one or more embodiments, the repository (106) includes transactions (114A, 114N). A transaction (114A) may be an exchange of an item of value. For example, a transaction (114A) may be an exchange of money, products, services, raw materials, inventory items, etc. A transaction (114A) may include categorical features (116) and a digit sequence (118). A categorical feature (116) is a feature whose corresponding value may be one of a set of discrete values. As an example, a "size" categorical feature may correspond to one of the values "small", "medium", or "large." The categorical features (116) may be thought of as metadata corresponding to the digit sequence (118). A digit sequence (118) may be a sequence of one or more digits. For example, each digit may be one of the numerals 0, 1, 2, 3, 4, 5, 6, 7, 8, or 9. Alternatively, each digit may be an alphanumeric character. The digit sequence (118) may be associated with a maximum permitted length. In one or more embodiments, the digit sequence (118) includes sequence digits and a checksum digit. For example, the checksum digit may be calculated (e.g., using a mathematical function) based on the sequence digits.

Figure 1B:
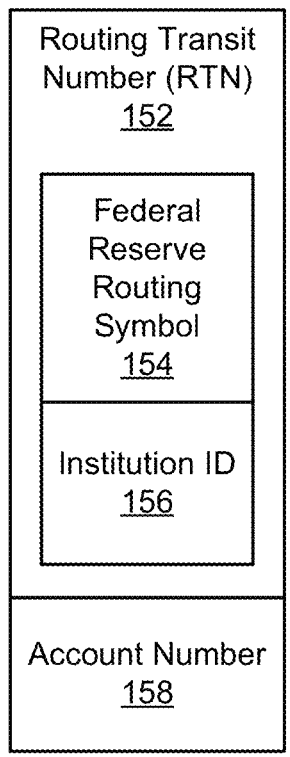

FIG. 1B shows an Automated Clearing House (ACH) transaction (150). The ACH transaction (150) is an example of a transaction (114A) of FIG. 1A. The ACH transaction (150) includes a routing transit number (RTN) (152) and an account number (158). In one or more embodiments, the RTN (152) is a categorical feature (116) that includes a Federal Reserve routing symbol (154) and an institution ID (156). The Federal Reserve routing symbol (154) identifies a Federal Reserve check processing center. The institution ID (156) identifies a financial institution (e.g., a bank) corresponding to the account number (158). Multiple institution IDs (156) may be associated with a financial institution. For example, the multiple institution IDs (156) may be due to mergers, acquisitions, or internal management systems of the financial institution. Alternatively, in one or more embodiments, the RTN (152) is a digit sequence (118).

In one or more embodiments, the account number (158) is a digit sequence (118). For example, the account number (158) may identify a specific account to credit or debit at the financial institution corresponding to the institution ID (156).

The ACH transaction (150) may include additional attributes, such as an amount, the name of the initiator of the ACH transaction (150), IP address from where the ACH transaction (150) was initiated, zip code, etc.

In one or more embodiments, the transaction validator (108) may be implemented in hardware (e.g., circuitry), software, firmware, and/or any combination thereof. In one or more embodiments, the transaction validator (108) includes functionality to apply a machine learning model (120) to validate a digit sequence (118) of a transaction (114A). In one or more embodiments, the transaction validator (108) includes functionality to extract categorical features (116) and a digit sequence (118) from a transaction (114A) received from a transaction source (104A). The transaction validator (108) may include functionality to classify a digit sequence (118) as invalid based on the output of the machine learning model (120).

Figure 1C:
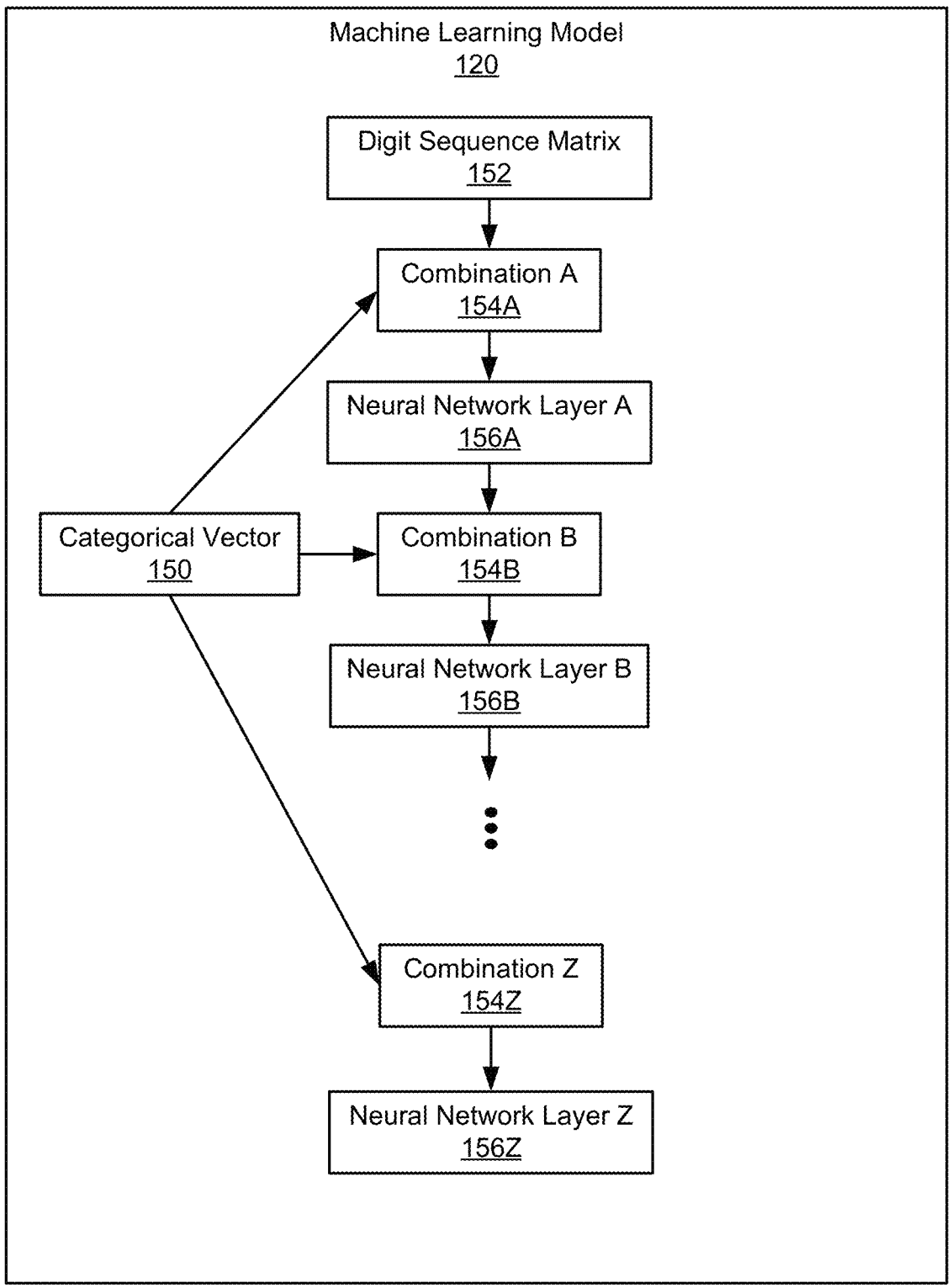

Turning to FIG. 1C, in one or more embodiments, the machine learning model (120) includes a categorical vector (150), a digit sequence matrix (152), one or more combinations (154A, 154B, 154Z), and one or more neural network layers (156A, 156B, 156Z). A categorical vector (150) is an embedding (e.g., a representation) of one or more categorical features (116). In one or more embodiments, the categorical vector (150) is a combination (e.g., a concatenation) of one or more vectors corresponding to one or more categorical features (116). A categorical vector (150) may be a semantic representation of one or more categorical features (116). The categorical vector (150) may be a vector (e.g., a point) in a multi-dimensional semantic space. In one or more embodiments, the value assigned to each dimension of a categorical vector (150) may be based on the co-occurrence of a categorical feature with one or more other categorical features in a set of training data.

Figure 1D:
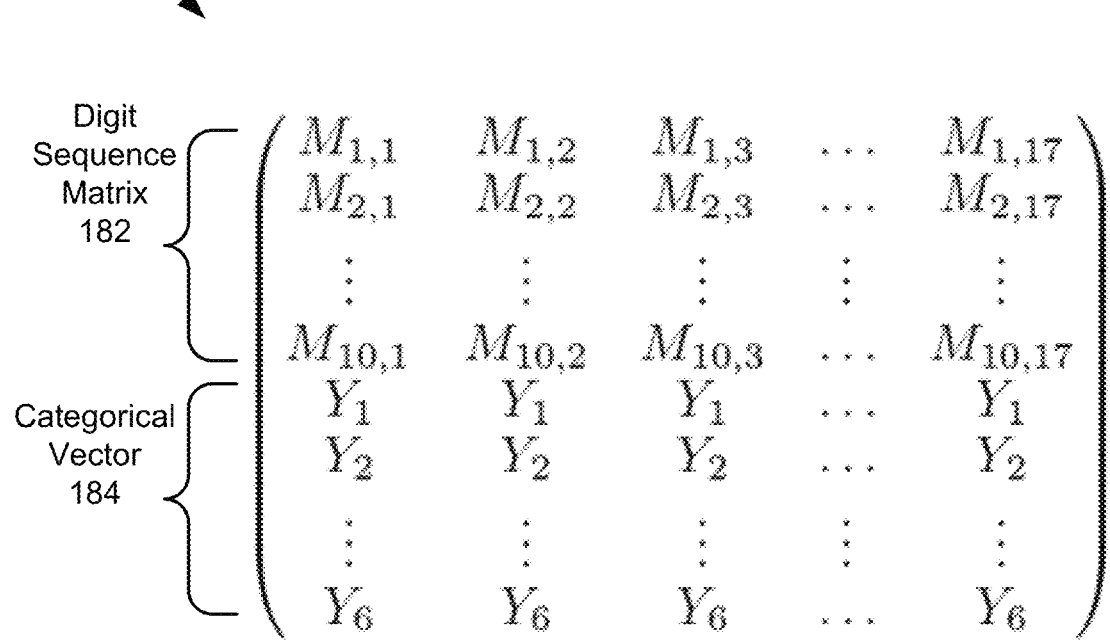

A digit sequence matrix (152) is an embedding of a digit sequence (118). For example, the digit sequence matrix (152) may be a one hot encoding of the digit sequence (118). The one hot encoding may facilitate processing by the machine learning model (120) when there is no intrinsic relationship among features. In this case, the features are the digits of the digit sequence (118). Continuing this example, the digit sequence matrix (152) may include a value of one (e.g., a "hot" value) in the column corresponding to a specific digit in the digit sequence (118) and a value of zero in the columns corresponding to the remaining digits in the digit sequence (118). FIG. 1D shows a digit sequence matrix (182) for a digit sequence containing 17 digits. Alternatively, the digit sequence (118) may be used as-is (i.e., without encoding) with a tree model (e.g., random forest, xgboost, support vector machine (SVM), etc.).

Returning to FIG. 1C, in one or more embodiments, a combination (e.g., 154A) combines a categorical vector (150) with a digit sequence matrix (e.g., 152). For example, FIG. 1D illustrates an example combination (180) that combines a digit sequence matrix (182) with a categorical vector (184). The example combination (180) concatenates values $Y_1 \ldots Y_6$ of the categorical vector (184) with each one hot encoded column of the digit sequence matrix (182). Returning to FIG. 1C, the result of a combination (e.g., 154A) may be a digit sequence matrix that is input to a neural network layer (e.g., 156A).

In one or more embodiments, a neural network layer (e.g., 156A) includes functionality to generate, as output, an encoding of its input. Both the input and output of a neural network layer may be digit sequence matrices. The output of a neural network layer (e.g., 156A, 156B) may be an input to a combination (e.g., 154B, 154C). A neural network layer may include one or more recurrent neural network layers (RNNs), long short term memory (LSTM) layers, and convolutional neural network (CNN) layers. A neural network layer (e.g., 156A, 156B, 156C) may include one or more blocks. The connections between the artificial neurons of the neural network layer are modeled as weights.

In one or more embodiments, the machine learning model (120) includes additional neural network layers. For example, the machine learning model (120) may include a fully connected neural network layer with multiple sub layers such that each input is connected to each output. The output from the fully connected layer may be a probability that a digit sequence (118) is invalid.

In one or more embodiments, the machine learning model (120) includes an activation layer that generates an activated digit sequence matrix from a digit sequence matrix. An activation function may be used to control the amplitude of the output. For example, an acceptable range of output may include real values between 0 and 1, or between −1 and 1 when an activation function is used. Without the activation function, the outputs may range between negative infinity and positive infinity. After generating the activated digit sequence matrix, backpropagation may be used to update the weights in the fully connected layer and/or other neural network layers. In one or more embodiments, the activation layer is used during the training of the neural network. For example, the neural network may be trained using transactions labeled as either "invalid digit sequence" or "valid digit sequence". Once the machine learning model (120) is trained, the activation layer may be omitted when using the machine learning model (120) to predict the validity of digit sequences (118) in new transactions (114A, 114N).

Figure 1E:
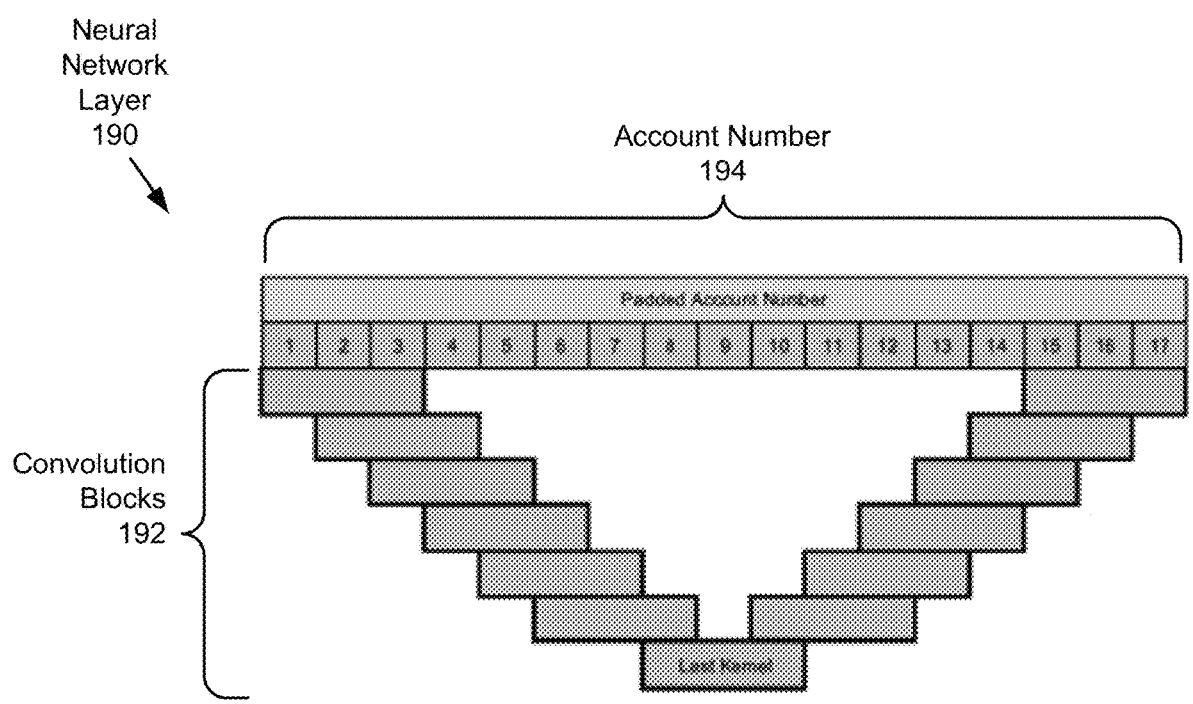

In one or more embodiments, the machine learning model (120) includes a sufficient number of neural network layers to guarantee that at least one neural network layer has a receptive field that includes the entire digit sequence (118). The receptive field is the portion of the input (e.g., the digital sequence (118)) that affects a particular neuron in a specific neural network layer. For example, in order for a neural network layer to learn patterns regarding the relationship between the checksum digit and the sequence digits, the receptive field of the neurons in a neural network layer may need to span all of the digits in the digit sequence (118). FIG. 1E shows an example of a neural network layer (190) that includes convolution blocks (192) each with a filter size of 3 digits. Since the length of an account number (194) (e.g., the digit sequence (118)), is 17 digits, then the neural network layer (190) may include at least 8 convolution blocks (192) in order to guarantee that at least one convolution block has a receptive field spanning the full 17 digits of the account number (194).

In one or more embodiments, the machine learning model (120) may be trained on additional attributes of transactions (114A). For example, the machine learning model (120) may be trained on additional attributes of ACH transactions (150), such as amount, name of initiator, IP address, zip code, etc.

While FIG. 1A, FIG. 1B, FIG. 1C, FIG. 1D, and FIG. 1E show configurations of components, other configurations may be used without departing from the scope of the invention. For example, various components may be combined to create a single component. As another example, the functionality performed by a single component may be performed by two or more components.

Figure 2:
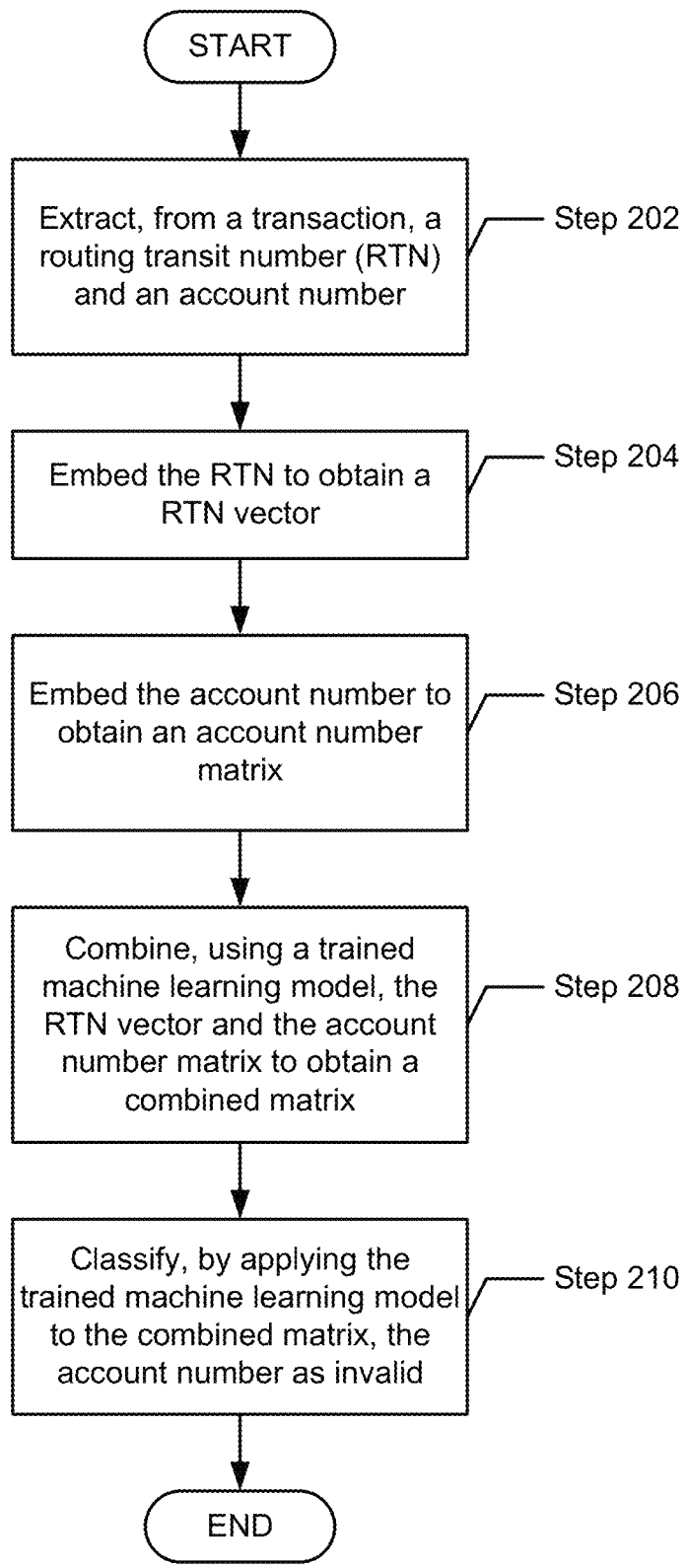
FIG. 2 shows a flowchart of a method in accordance with one or more embodiments of the invention.

FIG. 2 shows a flowchart in accordance with one or more embodiments of the invention. The flowchart depicts a process for validating an account number of a transaction. One or more of the steps in FIG. 2 may be performed by the components (e.g., the transaction validator (108) of the computer system (102)), discussed above in reference to FIG. 1A. In one or more embodiments of the invention, one or more of the steps shown in FIG. 2 may be omitted, repeated, and/or performed in parallel, or in a different order than the order shown in FIG. 2. Accordingly, the scope of the invention should not be considered limited to the specific arrangement of steps shown in FIG. 2.

Initially, in Step 202, at least a routing transit number (RTN) and an account number are extracted from a transaction. For example, the transaction validator may extract the RTN and the account number from an ACH transaction received from a transaction source, such as a bank or other financial institution. Continuing this example, the ACH transaction may be received from a financial management application executing at the transaction source. In one or more embodiments, to make each account number the same length, the transaction validator pads the account number by prefixing one or more instances of a non-numerical padding character to the account number. For example, the transaction validator may pad the account number by prefixing one or more instances of the padding character to the account number until the length of the account number is the maximum permitted length.

In Step 204, the RTN is embedded to obtain an RTN vector. In one or more embodiments, the transaction validator embeds the Federal Reserve routing symbol and the institution ID of the RTN in separate vectors, and then combines (e.g., concatenates) the separate vectors into the RTN vector. In one or more embodiments, the embedding of the RTN is performed by a neural network layer of a trained machine learning model. Alternatively, the RTN may be a digit sequence that is embedded in a digit sequence matrix.

In Step 206, the account number is embedded to obtain an account number matrix. For example, the account number matrix may be a one hot encoding of the account number. In one or more embodiments, the embedding of the account number is performed by a neural network layer of a trained machine learning model.

In Step 208, the RTN vector and the account number matrix are combined, using a trained machine learning model, to obtain a combined matrix. In one or more embodiments, the trained machine learning model applies a neural network layer to the account number matrix and concatenates the output of the neural network layer with the RTN vector. For example, see description of FIG. 3 below. Initial blocks (e.g., convolution blocks) in the neural network layer may learn local patterns in the account number, such as accidental mistyping or double digitizing. Later blocks in the neural network layer may encode the overall structure of the account number. For example, the later blocks may learn overall relationships, such as relationships between the checksum digit and the remainder of the account number. By concatenating the output of the neural network layer with the RTN vector, the trained machine learning model represents the relationship between the RTN vector and the account number. In one or more embodiments, if the RTN is embedded in a digit sequence matrix, the digit sequence matrix corresponding to the RTN may be combined with the digit sequence matrix corresponding to the account number.

Alternatively, the trained machine learning model may explicitly reinforce and encode relationships between the RTN and the account number by combining (e.g., concatenating) the RTN vector with the outputs of multiple neural network layers. See description of FIG. 4 below. Reinforcing attention on the relationships between the RTN and the account number at multiple neural network layers enables the multiple neural network layers to model relationships between RTNs and account numbers.

In Step 210, the account number is classified as invalid by applying the trained machine learning model to the combined matrix. In one or more embodiments, the trained machine learning model generates a probability that the account number is invalid. The transaction validator may classify the account number as invalid when the probability exceeds a threshold probability. The transaction validator may then process the transaction according to a policy based on classifying the account number as invalid. For example, the policy may be to decline the transaction when the probability of an invalid account number exceeds a first threshold probability (e.g., when the probability of an invalid account number is very high). Alternatively, the policy may be to delay processing of the transaction when the probability of an invalid account number is less than the first threshold probability and greater than a second threshold probability. In one or more embodiments, based on the policy, the transaction validator may generate a request for confirmation of the account number and/or RTN. For example, the transaction validator may send the request for confirmation to a financial management application executing at the transaction source. The request for confirmation may be displayed in a graphical user interface of the financial management application. For example, a user may be prompted to re-enter the account number and/or RTN into a graphical user interface element displayed by the financial management application.

Figure 3:
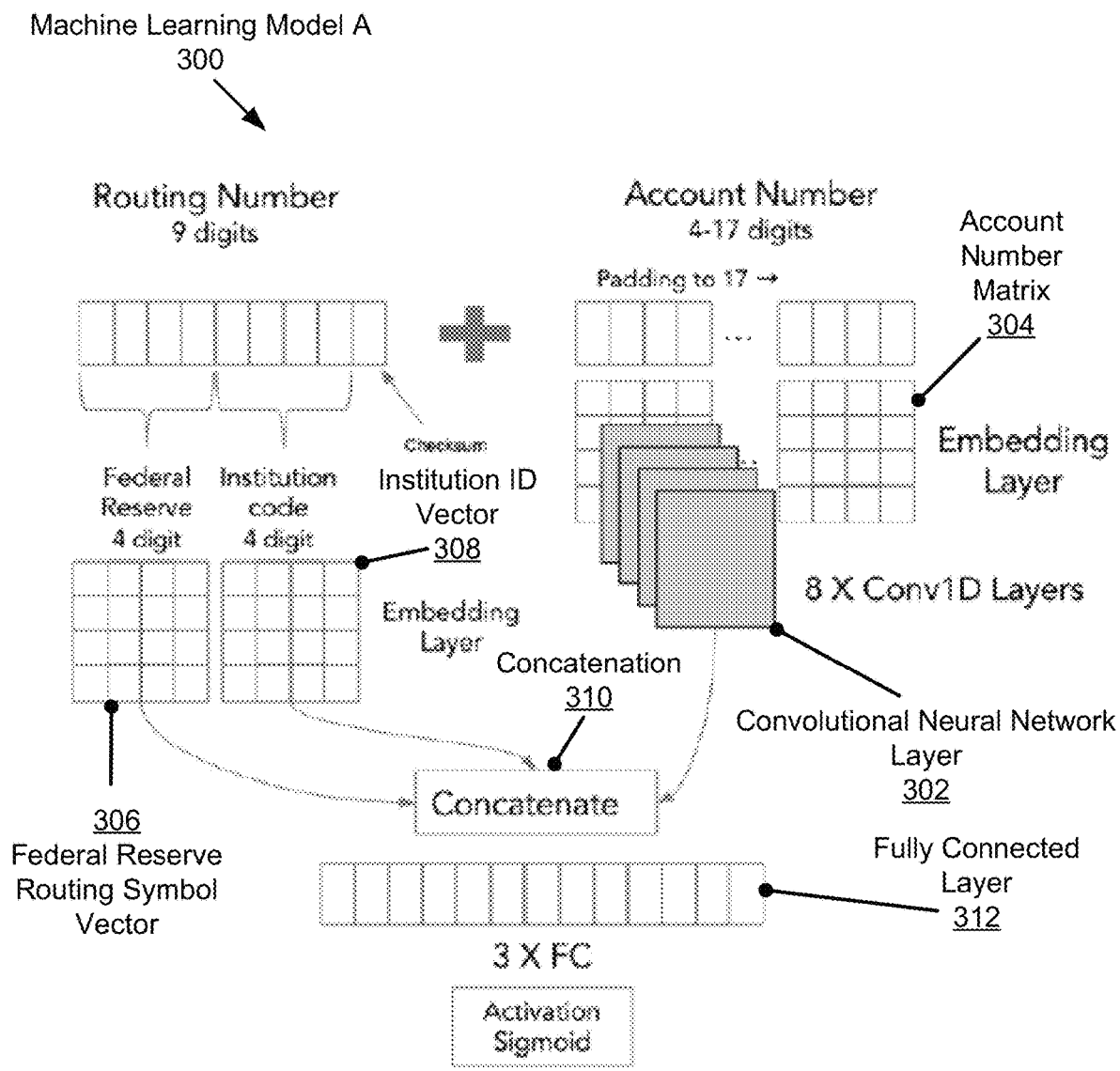
FIG. 3 and FIG. 4 show examples in accordance with one or more embodiments of the invention.
Figure 4:
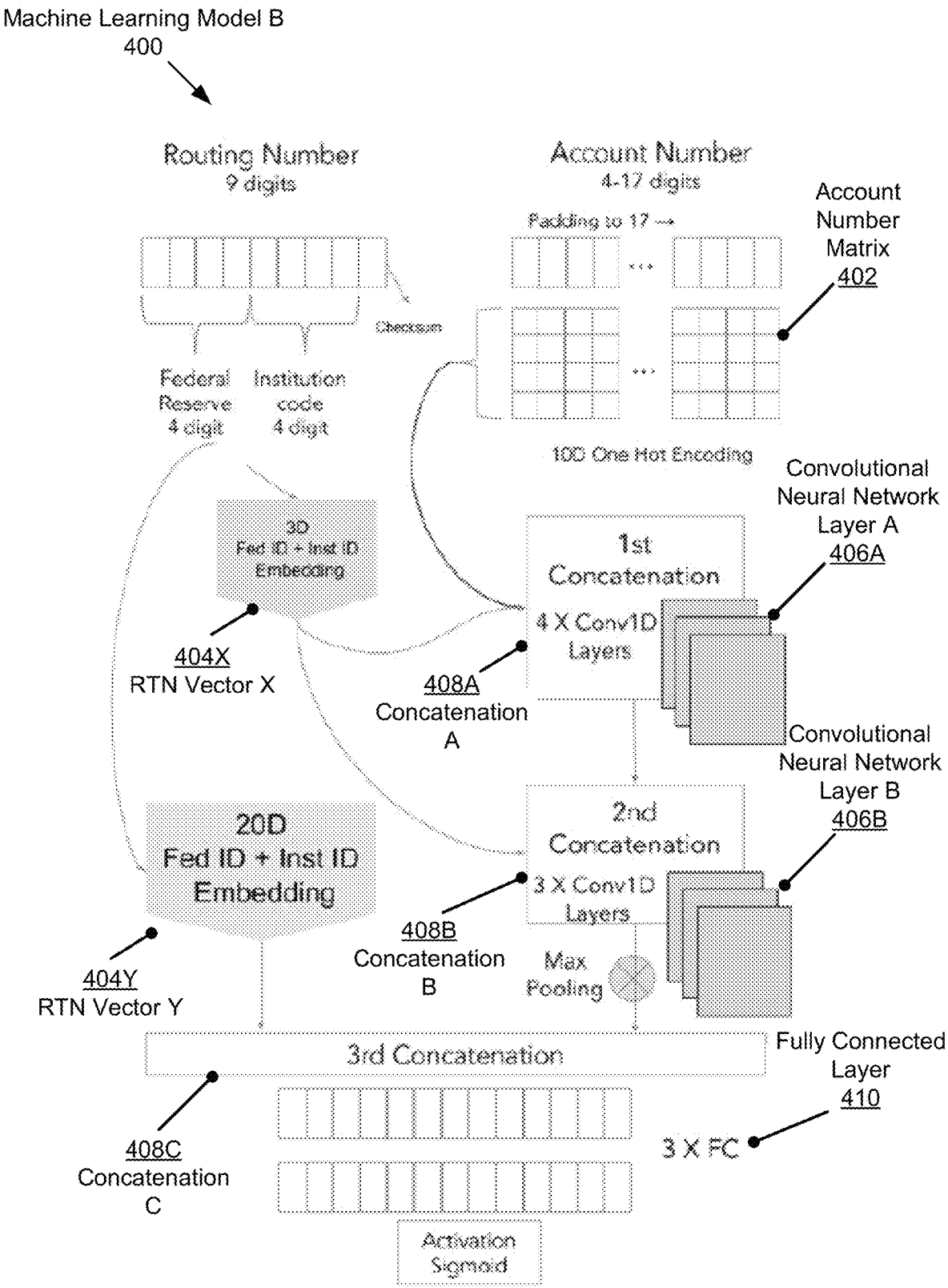

FIG. 3 and FIG. 4 show an implementation example(s) in accordance with one or more embodiments. The implementation example(s) are for explanatory purposes only and not intended to limit the scope of the invention. One skilled in the art will appreciate that implementation of embodiments of the invention may take various forms and still be within the scope of the invention.

FIG. 3 shows machine learning model A (300) ((120) in FIG. 1A and FIG. 1C) which predicts the validity of account numbers extracted from Automated Clearing House (ACH) transactions. Each ACH transaction includes a routing transit number (RTN) and an account number. Machine learning model A (300) includes a convolutional neural network (CNN) layer (302) ((156A, 156B, 156Z) in FIG. 1C) applied to an account number matrix (304) ((152) in FIG. 1C). Machine learning model A (300) is trained and validated using historical ACH transactions.

After the transaction validator extracts the RTN and account number from an ACH transaction, machine learning model A (300) generates a Federal Reserve routing symbol vector (306) corresponding to the Federal Reserve routing symbol of the RTN and an institution ID vector (308) corresponding to the institution ID of the RTN. Then, machine learning model A (300) generates an RTN vector by concatenating the Federal Reserve routing symbol vector (306) and the institution ID vector (308). Machine learning model A (300) also generates the account number matrix (304) as a one hot encoding matrix of the account number.

The CNN layer (302) includes 8 convolution blocks. The concatenation (310) ((154A, 154B, 154Z) in FIG. 1C) concatenates the output of the CNN layer (302) with the RTN vector. The result of the concatenation (310) is input into a fully connected layer (312). The fully connected layer (312) models the relationship between the RTN vector and the account number. The output of the fully connected layer (312) is a probability that the account number of the ACH transaction is invalid.

Experiments have shown that using the approach embodied in machine learning model A (300) for predicting an invalid ACH transaction detected 42% of wrongly entered ACH account numbers, with a high precision of 70%.

FIG. 4 shows machine learning model B (400) which predicts the validity of account numbers extracted from ACH transactions. Machine learning model B (400) is trained and validated using historical ACH transactions. After the transaction validator extracts the RTN and account number from an ACH transaction, machine learning model B (400) generates RTN vector X (404X) by concatenating vectors generated from the Federal Reserve routing symbol and institution ID of the RTN (e.g., as was also done by machine learning model A (300) of FIG. 3). RTN vector Y (404Y) is a higher dimension version of RTN vector X (404X). In this example, RTN vector Y (404Y) is based on more attributes (e.g., additional sub-features) of the RTN than RTN vector X (404X). Machine learning model B (400) also generates the account number matrix (402) as a one hot encoding matrix of the account number.

Concatenation A (408A) concatenates RTN vector X (404X) with the account number matrix (402). Convolutional neural network (CNN) layer A (406A) is then applied to the result of concatenation A (408A). By applying CNN layer A (406A) to the result of concatenation A (408A), CNN layer A (406A) is able to learn relationships between the RTN and the account number. In contrast, in FIG. 3, only the fully connected layer (312) of machine learning model A (300) models relationships between the RTN and the account number. Concatenation B (408B) concatenates RTN vector X (404X) with the output of CNN layer A (406A). CNN layer B (406B) is applied to the result of concatenation B (408B). Thus, CNN layer B (406B) is able to further reinforce attention on relationships between the RTN and the account number. Concatenation C (408C) concatenates RTN vector Y (404Y) with the output of CNN layer B (406B). A fully connected layer (410) is applied to the result of concatenation C (408C). Thus, the fully connected layer (410) is able to further reinforce attention on relationships between the RTN and the account number. The output of the fully connected layer (410) is a probability that the account number of the ACH transaction is invalid.

Experiments have shown that using the approach embodied in machine learning model B (400) for predicting an invalid ACH transaction detected 50% of wrongly entered ACH account numbers, with a high precision of 70%. Thus, the additional capability of machine learning model B (400) to detect wrongly entered ACH account numbers relative to machine learning model A (300) of FIG. 3 may be due to the additional reinforcement of the relationships between the RTN and the account number in machine learning model B (400).

Figure 5A:
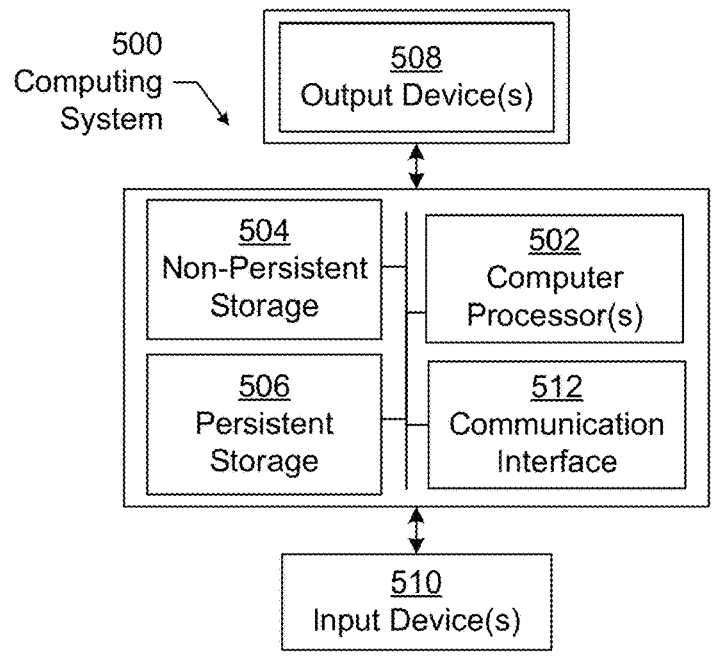
FIG. 5A and FIG. 5B show a flow diagram of computing systems in accordance with one or more embodiments of the invention.

Embodiments disclosed herein may be implemented on a computing system. Any combination of mobile, desktop, server, router, switch, embedded device, or other types of hardware may be used. For example, as shown in FIG. 5A, the computing system (500) may include one or more computer processors (502), non-persistent storage (504) (e.g., volatile memory, such as random access memory (RAM), cache memory), persistent storage (506) (e.g., a hard disk, an optical drive such as a compact disk (CD) drive or digital versatile disk (DVD) drive, a flash memory, etc.), a communication interface (512) (e.g., Bluetooth interface, infrared interface, network interface, optical interface, etc.), and numerous other elements and functionalities.

The computer processor(s) (502) may be an integrated circuit for processing instructions. For example, the computer processor(s) may be one or more cores or micro-cores of a processor. The computing system (500) may also include one or more input devices (510), such as a touchscreen, keyboard, mouse, microphone, touchpad, electronic pen, or any other type of input device.

The communication interface (512) may include an integrated circuit for connecting the computing system (500) to a network (not shown) (e.g., a local area network (LAN), a wide area network (WAN) such as the Internet, mobile network, or any other type of network) and/or to another device, such as another computing device.

Further, the computing system (500) may include one or more output devices (508), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (502), non-persistent storage (504), and persistent storage (506). Many different types of computing systems exist, and the aforementioned input and output device(s) may take other forms.

Software instructions in the form of computer readable program code to perform embodiments disclosed herein may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments disclosed herein.

Figure 5B:
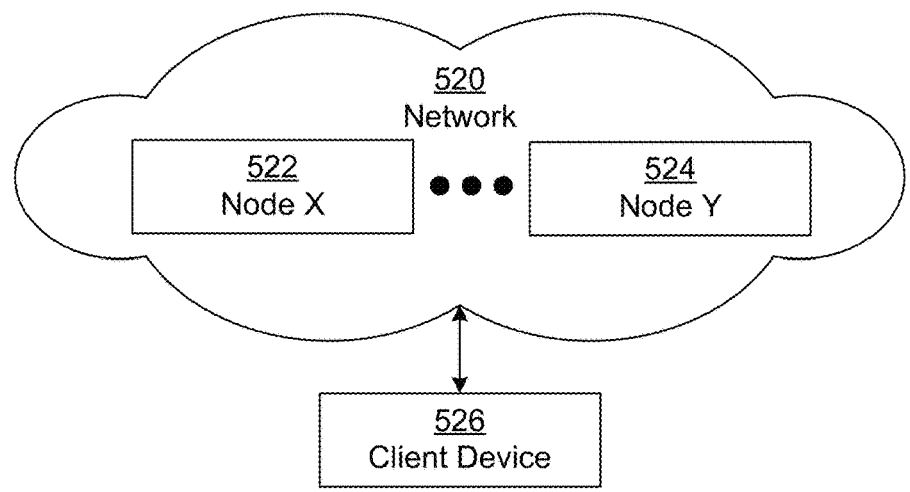

The computing system (500) in FIG. 5A may be connected to or be a part of a network. For example, as shown in FIG. 5B, the network (520) may include multiple nodes (e.g., node X (522), node Y (524)). Each node may correspond to a computing system, such as the computing system shown in FIG. 5A, or a group of nodes combined may correspond to the computing system shown in FIG. 5A. By way of an example, embodiments disclosed herein may be implemented on a node of a distributed system that is connected to other nodes. By way of another example, embodiments disclosed herein may be implemented on a distributed computing system having multiple nodes, where each portion disclosed herein may be located on a different node within the distributed computing system. Further, one or more elements of the aforementioned computing system (500) may be located at a remote location and connected to the other elements over a network.

Although not shown in FIG. 5B, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes (e.g., node X (522), node Y (524)) in the network (520) may be configured to provide services for a client device (526). For example, the nodes may be part of a cloud computing system. The nodes may include functionality to receive requests from the client device (526) and transmit responses to the client device (526). The client device (526) may be a computing system, such as the computing system shown in FIG. 5A. Further, the client device (526) may include and/or perform all or a portion of one or more embodiments disclosed herein.

The computing system or group of computing systems described in FIGS. 5A and 5B may include functionality to perform a variety of operations disclosed herein. For example, the computing system(s) may perform communication between processes on the same or different system. A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file. Further details pertaining to a couple of these non-limiting examples are provided below.

Based on the client-server networking model, sockets may serve as interfaces or communication channel endpoints enabling bidirectional data transfer between processes on the same device. Foremost, following the client-server networking model, a server process (e.g., a process that provides data) may create a first socket object. Next, the server process binds the first socket object, thereby associating the first socket object with a unique name and/or address. After creating and binding the first socket object, the server process then waits and listens for incoming connection requests from one or more client processes (e.g., processes that seek data). At this point, when a client process wishes to obtain data from a server process, the client process starts by creating a second socket object. The client process then proceeds to generate a connection request that includes at least the second socket object and the unique name and/or address associated with the first socket object. The client process then transmits the connection request to the server process. Depending on availability, the server process may accept the connection request, establishing a communication channel with the client process, or the server process, busy in handling other operations, may queue the connection request in a buffer until server process is ready. An established connection informs the client process that communications may commence. In response, the client process may generate a data request specifying the data that the client process wishes to obtain. The data request is subsequently transmitted to the server process. Upon receiving the data request, the server process analyzes the request and gathers the requested data. Finally, the server process then generates a reply including at least the requested data and transmits the reply to the client process. The data may be transferred, more commonly, as datagrams or a stream of characters (e.g., bytes). Similarly, sockets may serve as interfaces or communication channel end-points enabling bidirectional data transfer between processes on the different devices (e.g., different servers).

Shared memory refers to the allocation of virtual memory space in order to substantiate a mechanism for which data may be communicated and/or accessed by multiple processes. In implementing shared memory, an initializing process first creates a shareable segment in persistent or non-persistent storage. Post creation, the initializing process then mounts the shareable segment, subsequently mapping the shareable segment into the address space associated with the initializing process. Following the mounting, the initializing process proceeds to identify and grant access permission to one or more authorized processes that may also write and read data to and from the shareable segment. Changes made to the data in the shareable segment by one process may immediately affect other processes, which are also linked to the shareable segment. Further, when one of the authorized processes accesses the shareable segment, the shareable segment maps to the address space of that authorized process. Often, only one authorized process may mount the shareable segment, other than the initializing process, at any given time.

Other techniques may be used to share data, such as the various data described in the present application, between processes without departing from the scope of the invention. The processes may be part of the same or different application and may execute on the same or different computing system.

The computing system in FIG. 5A may implement and/or be connected to a data repository. For example, one type of data repository is a database. A database is a collection of information configured for ease of data retrieval, modification, re-organization, and deletion. Database Management System (DBMS) is a software application that provides an interface for users to define, create, query, update, or administer databases.

The user, or software application, may submit a statement or query into the DBMS. Then the DBMS interprets the statement. The statement may be a select statement to request information, update statement, create statement, delete statement, etc. Moreover, the statement may include parameters that specify data, or data container (e.g., database, table, record, column, view, etc.), identifier(s), conditions (comparison operators), functions (e.g., join, full join, count, average, etc.), sort (e.g., ascending, descending), or others. The DBMS may execute the statement. For example, the DBMS may access a memory buffer, a reference or index a file for read, write, deletion, or any combination thereof, for responding to the statement. The DBMS may load the data from persistent or non-persistent storage and perform computations to respond to the query. The DBMS may return the result(s) to the user or software application.

The above description of functions presents only a few examples of functions performed by the computing system of FIG. 5A and the nodes and/or client device in FIG. 5B. Other functions may be performed using one or more embodiments disclosed herein.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method, comprising:
    extracting, from a transaction, at least a routing transit number (RTN) and an account number;
    embedding the RTN in an RTN vector;
    embedding the account number in an account number matrix;
    combining, using a trained machine learning model, the RTN vector and the account number matrix to obtain a combined matrix; and
    classifying the account number as invalid, the classifying comprising applying the trained machine learning model to the combined matrix, wherein applying the trained machine learning model reinforces attention on a dependency between the RTN and the account number.

2. The method of claim 1, further comprising:
    processing the transaction based on classifying the account number as invalid.

3. The method of claim 1, wherein the trained machine learning model comprises a first neural network layer and a second neural network layer, and wherein combining the RTN vector and the account number matrix comprises:
    encoding, using the first neural network layer, a combination of the RTN vector and the account number matrix to obtain an output; and
    encoding, using the second neural network layer, a combination of the RTN vector and the output.

4. The method of claim 1, wherein the trained machine learning model comprises a neural network layer whose receptive field spans the account number.

5. The method of claim 1, wherein the RTN comprises a Federal Reserve routing symbol and an institution ID, and wherein embedding the RTN comprises:
    embedding the Federal Reserve routing symbol in a first vector; and
    embedding the institution ID in a second vector; and
    concatenating the first vector and the second vector.

6. The method of claim 1, wherein the account number matrix is a hot one encoding matrix, and wherein combining the RTN vector and the account number matrix comprises:

concatenating the hot one encoding matrix with the RTN vector.

7. The method of claim 1, wherein the RTN is a digit sequence.

8. A system, comprising:
a computer processor;
a repository configured to store at least a transaction comprising a routing transit number (RTN) and an account number; and
a transaction validator executing on the computer processor and configured to:
extract the RTN and the account number from the transaction;
embed the RTN in an RTN vector;
embed the account number in an account number matrix;
combine, using a trained machine learning model, the RTN vector and the account number matrix to obtain a combined matrix; and
classify, using the combined matrix, the account number as invalid, the classifying comprising applying the trained machine learning model to the combined matrix, wherein applying the trained machine learning model reinforces attention on a dependency between the RTN and the account number.

9. The system of claim 8, wherein the transaction validator is further configured to:
process the transaction based on classifying the account number as invalid.

10. The system of claim 8, further comprising a trained machine learning model configured to:
encode, using a first neural network layer, a combination of the RTN vector and the account number matrix to obtain an output; and
encode, using a second neural network layer, a combination of the RTN vector and the output.

11. The system of claim 10, wherein the trained machine learning model comprises a neural network layer whose receptive field spans the account number.

12. The system of claim 8, wherein the RTN comprises a Federal Reserve routing symbol and an institution ID, and wherein the transaction validator is further configured to embed the RTN by:
embedding the Federal Reserve routing symbol in a first vector; and
embedding the institution ID in a second vector; and
concatenating the first vector and the second vector.

13. The system of claim 8, wherein the RTN is a digit sequence.

14. A method, comprising:
extracting, from a transaction, one or more categorical features and a digit sequence;
embedding the one or more categorical features in a categorical vector;
embedding the digit sequence in a digit sequence matrix;
encoding, using a first neural network layer of a trained machine learning model, a combination of the categorical vector and the digit sequence matrix to obtain a first output;
encoding, using a second neural network layer of the trained machine learning model, a combination of the categorical vector and the first output to obtain a second output; and
classifying the digit sequence as invalid, the classifying comprising applying the trained machine learning model to the second output, wherein applying the trained machine learning model reinforces attention on a dependency between the one or more categorical features and the digit sequence.

15. The method of claim 14, further comprising:
processing the transaction based on classifying the digit sequence as invalid.

16. The method of claim 14, wherein the trained machine learning model comprises a neural network layer whose receptive field spans the digit sequence.

17. The method of claim 14, wherein the one or more categorical features comprise a first categorical feature and a second categorical feature, and wherein embedding the one or more categorical features comprises:
embedding the first categorical feature in a first vector; and
embedding the second categorical feature in a second vector; and
concatenating the first vector and the second vector.

18. The method of claim 14, wherein the digit sequence matrix is a hot one encoding matrix, and wherein the combination of the categorical vector and the digit sequence matrix is a concatenation of the hot one encoding matrix with the digit sequence matrix.

* * * * *